(12) United States Patent
Hirose et al.

(10) Patent No.: US 10,850,439 B2
(45) Date of Patent: Dec. 1, 2020

(54) INJECTION MOLDING MACHINE

(71) Applicant: FANUC CORPORATION, Yamanashi (JP)

(72) Inventors: Daisuke Hirose, Yamanashi (JP); Koichi Nishimura, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 387 days.

(21) Appl. No.: 15/581,180

(22) Filed: Apr. 28, 2017

(65) Prior Publication Data

US 2017/0326770 A1 Nov. 16, 2017

(30) Foreign Application Priority Data

May 13, 2016 (JP) .................................. 2016-097398

(51) Int. Cl.
*B29C 45/76* (2006.01)
*B29C 45/17* (2006.01)

(52) U.S. Cl.
CPC .......... *B29C 45/76* (2013.01); *B29C 45/1777* (2013.01); *B29C 2945/76006* (2013.01); *B29C 2945/76217* (2013.01); *B29C 2945/76381* (2013.01); *B29C 2945/76481* (2013.01); *B29C 2945/76498* (2013.01); *B29C 2945/76695* (2013.01); *B29C 2945/76859* (2013.01)

(58) Field of Classification Search
None
See application file for complete search history.

(56) References Cited

U.S. PATENT DOCUMENTS 4,676,730 A * 6/1987 Yamasaki ........... B29C 45/1777
425/569
5,147,659 A * 9/1992 Watanabe ........... B29C 45/1777
425/145
(Continued)

FOREIGN PATENT DOCUMENTS

EP 2633969 A1 9/2013
JP H0245113 A 2/1990
(Continued)

OTHER PUBLICATIONS

Omega: Strain gauge installation how to position strain gauges to monitor bending, axial, shear, and torsional loads. Published Mar. 25, 2015. Retrieved Online Oct. 26, 2018. https://www.omega.co.uk/techref/pdf/Strain-gauge-application-info/how-to-position-strain-gauges.pdf (Year: 2015).*

(Continued)

*Primary Examiner* — Seyed Masoud Malekzadeh
*Assistant Examiner* — Manley L Cummins, IV
(74) *Attorney, Agent, or Firm* — Hauptman Ham, LLP

(57) ABSTRACT

An injection molding machine is provided with a nozzle touch mechanism configured to press a nozzle attached to an injection device against a mold, a drive unit configured to move the injection device, a drive compression member connected to the drive unit, an injection compression member connected to the injection device, at least one resilient member interposed preloaded between the drive compression member and the injection compression member, and at least one strain sensor mounted on the drive compression member.

8 Claims, 4 Drawing Sheets

(56) References Cited

U.S. PATENT DOCUMENTS

| | | | |
|---|---|---|---|
| 5,462,428 A * | 10/1995 | Ito | B29C 45/1777 425/567 |
| 6,432,333 B1 * | 8/2002 | Emoto | B29C 45/1777 264/328.11 |
| 2001/0010172 A1 * | 8/2001 | Kawasaki | B29C 45/4005 73/384 |
| 2005/0084556 A1 * | 4/2005 | Yoshioka | B29C 45/1777 425/149 |
| 2006/0127528 A1 * | 6/2006 | Schmidt | B29C 45/07 425/574 |
| 2010/0255136 A1 * | 10/2010 | Brunbauer | B29C 45/1761 425/150 |
| 2014/0088757 A1 * | 3/2014 | Inami | B29C 45/5008 700/200 |
| 2015/0158222 A1 | 6/2015 | Kitta et al. | |
| 2017/0066172 A1 * | 3/2017 | Nagano | B29C 45/1774 |

FOREIGN PATENT DOCUMENTS

| | | | |
|---|---|---|---|
| JP | H2-63713 A | | 3/1990 |
| JP | H0263713 | * | 3/1990 |
| JP | 2000-343280 A | | 12/2000 |
| JP | 2001328140 A | | 11/2001 |
| JP | 2002-364723 A | | 12/2002 |
| JP | 2006027248 A | | 2/2006 |
| JP | 2012011579 A | | 1/2012 |
| JP | 2013180515 A | | 9/2013 |
| WO | 2014/007329 A1 | | 1/2014 |

OTHER PUBLICATIONS

Office Action in JP Application No. 2016-097398, dated Jun. 5, 2018, 4pp.

Office Action in DE Application No. 102017004375.2, dated Nov. 27, 2019; 12 pp.

* cited by examiner

SURFACE OPPOSITE TO BALL SCREW NUT MOUNTING SURFACE

BALL SCREW NUT MOUNTING SURFACE

INJECTION MOLDING MACHINE

RELATED APPLICATIONS

The present application claims priority to Japanese Application Number 2016-097398 filed May 13, 2016, the disclosure of which is hereby incorporated by reference herein in its entirety.

BACKGROUND OF THE INVENTION

Field of the Invention

The present invention relates to an injection molding machine, and more particularly, to an injection molding machine capable of detecting and controlling a nozzle touch force not higher than the preload of a spring, in producing the nozzle touch force by means of the resilient force of the spring.

Description of the Related Art

In an injection molding machine comprising a mold clamping mechanism configured to apply a clamping force to a mold and an injection mechanism configured to inject a molten resin into the mold, it is necessary to press a nozzle, which is attached to the distal end portion of a cylinder for melting the resin, against the mold in order to inject the resin into the mold.

In pressing the nozzle against the mold, the nozzle must be pressed with a predetermined force (nozzle touch force) lest the resin being injected leak out from between the nozzle and the mold. When the mold is open, in contrast, the nozzle touch force should be minimized so that deformation of the mold can be suppressed to improve the durability of the mold.

Conventional methods for producing a nozzle touch force include a method based on the pressure of a hydraulic pump (e.g., Japanese Patent Application Laid-Open No. 2013-180515) and a method based on the resilient force of a spring (e.g., Japanese Patent Applications Laid-Open Nos. 2001-328140 and 2012-011579). In the case where the hydraulic pump is used, the nozzle touch force can be controlled by being measured by the output of a liquid pressure gauge attached to the hydraulic pump. Thus, the nozzle touch force during injection can be differentiated from that during mold opening.

In the case where the resilient force of a spring is used, on the other hand, the nozzle touch force can be measured by measuring the amount of compression of the spring. Moreover, in a conventional technique disclosed in Japanese Patent Application Laid-Open No. 02-045113, the nozzle touch force is estimated based on a value measured by a strain sensor mounted on an injection unit.

Unless the spring is used under a normal preload, as also described in Japanese Patent Application Laid-Open No. 2001-328140, its lifetime may be reduced or it may move without being fixed, thereby preventing smooth operation of the injection molding machine. Therefore, in the case where the spring is used to produce the nozzle touch force, it is preloaded. If the nozzle touch force is not larger than the preload of the spring, in this case, the spring cannot be compressed. Thus, there is a problem that it is difficult to detect the nozzle touch force by the amount of compression of the spring.

Moreover, in the technique disclosed in Japanese Patent Application Laid-Open No. 02-045113, the amount of compression of a spring is not directly used for the estimation of the nozzle touch force, and the nozzle touch force is indirectly estimated by detecting a distortion produced in the injection unit after the start of compression of the spring. Even though the strain sensor is simply mounted on a junction or the like of an injection unit, the distortion of which is detected by the drive of an injection unit moving device, however, hardly any distortion is produced at the junction if the nozzle touch force is not larger than the spring preload. Thus, the distortion cannot be detected by the strain sensor, so that the nozzle touch force cannot be accurately estimated.

SUMMARY OF THE INVENTION

Accordingly, the object of the present invention is to provide an injection molding machine capable of detecting and controlling a nozzle touch force not higher than the preload of a spring, in producing the nozzle touch force by means of the resilient force of the spring.

In the present invention, a compression member for compressing a spring is fitted with a strain sensor for detecting a strain of the compression member, and a nozzle touch force is estimated based on a strain amount detected by the mounted strain sensor. After a mold is contacted by a nozzle, the compression member is subjected to a sufficiently detectable strain even when the nozzle touch force is not larger than the preload of the spring, so that the nozzle touch force can be controlled by detecting the strain by means of the strain sensor.

An injection molding machine according to the present invention comprises a nozzle touch mechanism configured to press a nozzle attached to an injection device against a mold, a drive unit configured to move the injection device, a drive compression member connected to the drive unit, an injection compression member connected to the injection device, at least one resilient member interposed preloaded between the drive compression member and the injection compression member, and at least one strain sensor mounted on the drive compression member.

A plurality of the strain sensors can be attached to the drive compression member.

The injection molding machine can further comprise a nozzle touch force calculation unit configured to calculate a nozzle touch force based on an output value or values output from the strain sensor or sensors.

The drive unit may comprise a motor and a ball screw, and a ball screw nut in threaded engagement with a ball screw shaft of the ball screw may be secured to the drive compression member.

The strain sensor may be mounted on the surface of the drive compression member on which the ball screw nut is mounted and/or the opposite surface of the drive compression member.

A plurality of the resilient members may be installed and the strain sensor or sensors may be mounted between the plurality of resilient members, as viewed from the surface of the drive compression member on which the ball screw nut is mounted.

The strain sensor or sensors may be mounted between the ball screw nut and the resilient member or members, as viewed from the surface of the drive compression member on which the ball screw nut is mounted.

According to the present invention, even in the case where a nozzle touch force is produced by means of the resilient force of a spring with a preload, control can be performed so that a predetermined nozzle touch force is produced to prevent resin leakage during injection and the nozzle touch force is reduced to such a degree that a mold does not leave a nozzle during mold opening, whereby deformation of the mold by the nozzle touch force can be suppressed to improve the durability of the mold.

DETAILED DESCRIPTION OF THE PREFERRED EMBODIMENTS

Figure 1:
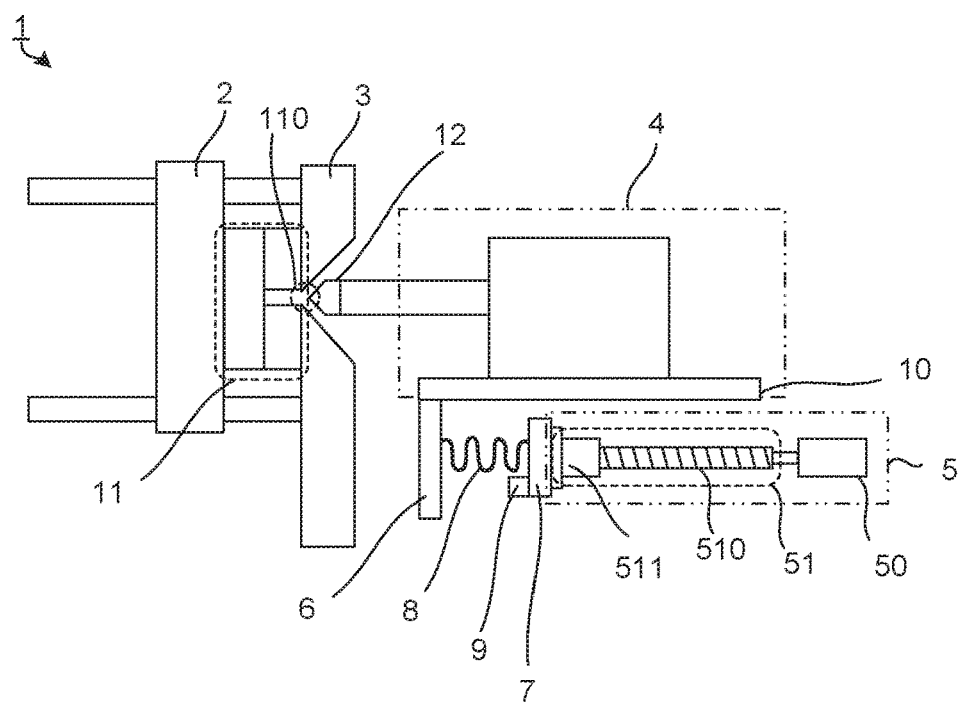
FIG. 1 is a schematic view showing a configuration of a principal part of an injection molding machine according to one embodiment of the present invention.

FIG. 1 is a schematic view showing a configuration of a principal part of an injection molding machine according to one embodiment of the present invention.

In an injection molding machine 1 according to the present embodiment, a drive compression member 7 is connected to a drive unit 5. A combination of a motor 50 and a ball screw 51, as shown in FIG. 1, or an oil-hydraulic pump may be used as the drive unit 5. In the injection molding machine 1 shown in FIG. 1, the drive unit 5 is provided with a ball screw shaft 510, which is connected to the motor 50, and the ball screw 51 comprising a ball screw nut 511 in threaded engagement with the ball screw shaft 510. As the ball screw nut 511 is secured to the drive compression member 7, the drive unit 5 and the drive compression member 7 are connected to each other.

Moreover, an injection base 10 is equipped with an injection device 4 and fixedly fitted with an injection compression member 6. A plurality of resilient members 8 are mounted preloaded between the drive compression member 7 and the injection compression member 6, while a strain sensor 9 is mounted on the drive compression member 7.

Moreover, a mold clamping device 2 is set in a position opposite to a nozzle 12 attached to the injection device 4. A mold 11 furnished with a sprue 110 is secured to a fixed platen 3.

When the drive unit 5 is operated, in the injection molding machine 1 shown in FIG. 1, the drive compression member 7 moves to the left of FIG. 1 (or toward the fixed platen 3). As the force of the compression member 7 is transmitted through the resilient members 8 to the injection compression member 6 secured to the injection base 10, the injection base 10 moves toward the mold 11. As the injection base 10 moves in this manner, the injection device 4 on the injection base 10 moves to the left of FIG. 1 (or toward the mold 11). Thereupon, the tip of the nozzle 12 of the injection device 4 is pressed against the sprue 110 of the mold 11, thereby producing a nozzle touch force. As this is done, a strain corresponding to the nozzle touch force is produced, along with the nozzle touch force not higher than a preload, on the drive compression member 7. Thus, the nozzle touch force can be measured by the strain sensor 9.

Figure 2:
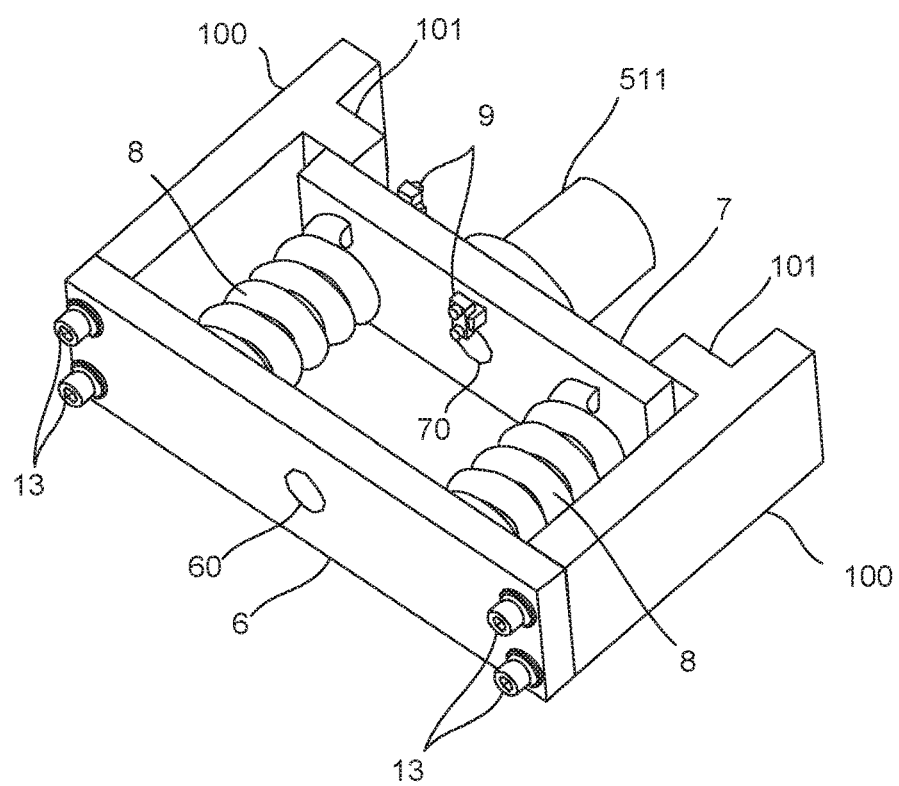
FIG. 2 is a view showing resilient members and their surroundings (1) at the time when no nozzle touch force is produced.
Figure 3:
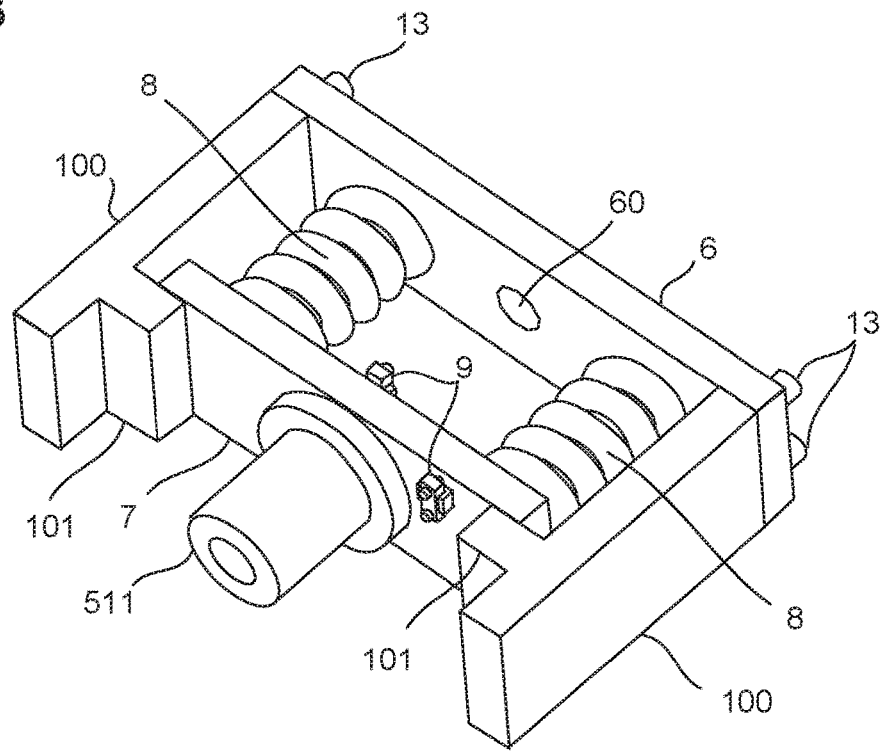
FIG. 3 is a view showing the resilient members and their surroundings (2) at the time when no nozzle touch force is produced.

FIGS. 2 and 3 show the resilient members 8 and their surroundings at the time when no nozzle touch force is produced. The resilient members 8, two in number, are installed between the drive compression member 7 and the injection compression member 6.

The injection base 10 is provided with a pair of induction members 100, and the injection compression member 6 is secured to respective one ends of the induction members 100 by bolts 13. The resilient members 8 are installed in an area surrounded by the injection compression member 6 and the pair of induction members 100. The one end of each resilient member 8 abuts on the injection compression member 6, while the other end abuts on the drive compression member 7 to which the ball screw nut 511 is secured.

A preload support portion 101 is provided near the end portion of each induction member 100 opposite to the end portion to which the injection compression member 6 is secured. The two resilient members 8 are individually supported by the respective preload support portions 101 of the two induction members 100, whereby the preload is maintained so that each resilient member 8 is shorter than a certain length. Reference numerals 60 and 70 denote passing holes for the ball screw shaft 510 formed in the injection compression member 6 and the drive compression member 7, respectively.

As described above, the strain sensor 9 is mounted on the drive compression member 7. In the present embodiment, the strain sensor 9 is bolted to the drive compression member 7 by using a fixture. The strain sensor 9 may be mounted by any other means only if it can measure the strain of the drive compression member 7. The surface of the drive compression member 7 on which the strain sensor 9 is mounted may be the surface on which the ball screw nut 511 is mounted, which is easily deformed by the production of the nozzle touch force, or the surface opposite thereto. These two surfaces are different in the type of the strain produced thereon. Specifically, a compressive strain is produced on the surface of the drive compression member 7 on which the ball screw nut 511 is mounted, while a tensile strain is produced on the surface opposite to the surface on which the ball screw nut 511 is mounted. Moreover, different components are arranged on the opposite surfaces, so that the strain sensor 9 can be mounted in different areas. The surface of the drive compression member 7 on which the strain sensor 9 is to be mounted should only be selected in consideration of these differences. Furthermore, large strains are produced in positions between or near the one and the other resilient members 8 and in positions between or near the ball screw nut 511 and the resilient members 8, as viewed from the surface of the drive compression member 7 on which the ball screw nut 511 is mounted. Thus, it is preferable to mount the strain sensor 9 in any of those positions.

Figure 4:
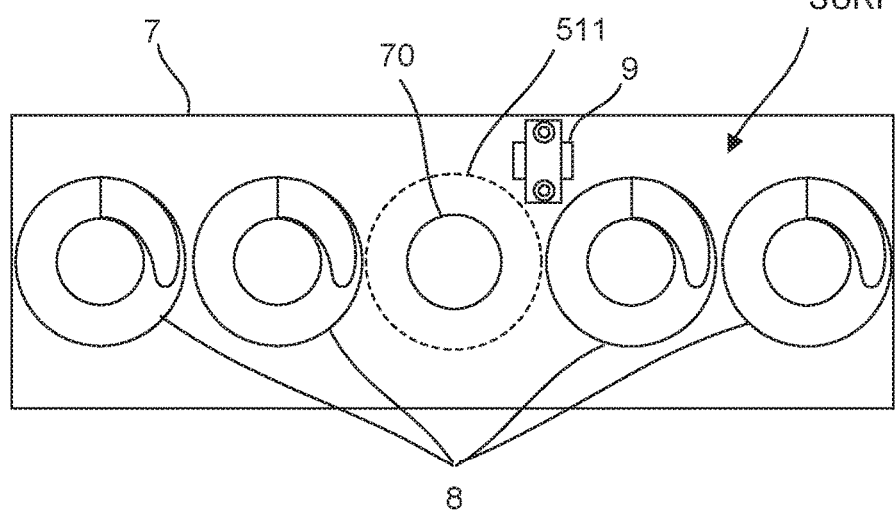
FIG. 4 is a view of a drive compression member with a plurality of resilient members thereon, taken from a surface on which the resilient members abut.
Figure 5:
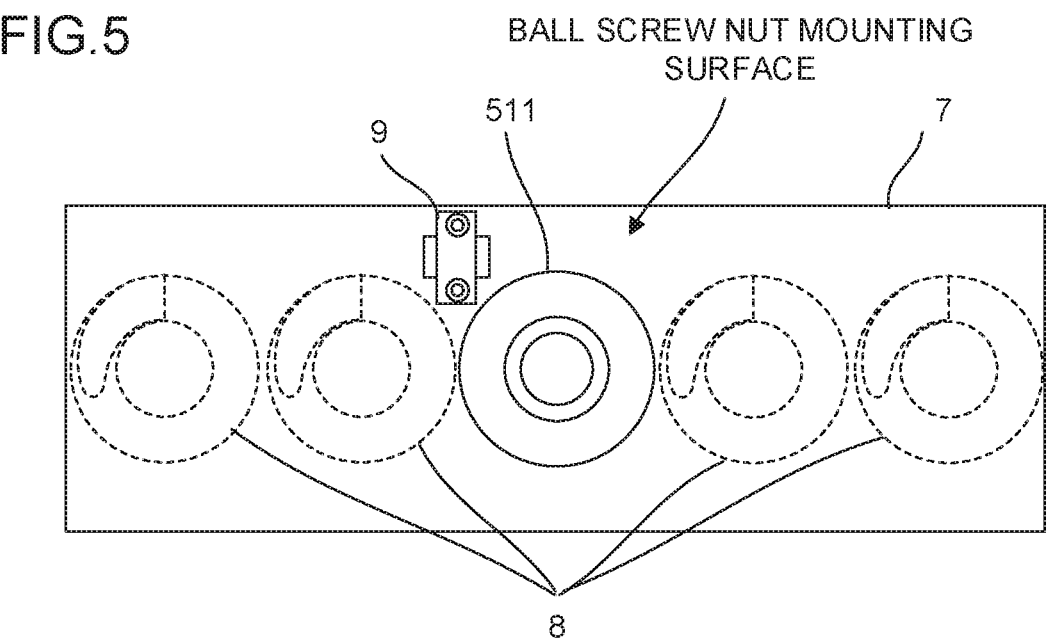
FIG. 5 is a view of the drive compression member of FIG. 4 taken from a mounting surface for a ball screw nut.

FIG. 4 is a view of the drive compression member 7 with a plurality of resilient members 8 thereon, taken from the surface on which the resilient members 8 abut (or the surface opposite to the mounting surface for the ball screw nut 511), and FIG. 5 is a view of the drive compression member 7 taken from the surface on which the ball screw nut 511 is mounted.

Also in a case where the mounted resilient members 8 are three or more in number, the strain sensor 9 should only be mounted in a position between or near the resilient members 8 or in a position between or near the ball screw nut 511 and the resilient members 8. Preferably, however, the strain sensor 9 should be mounted between or near the ball screw nut 511 and the resilient members 8, as shown in FIGS. 4 and 5, since particularly large strains are easily produced in the vicinity of the ball screw nut 511.

Possibly, moreover, strains may slightly vary depending on the position of measurement. To overcome this problem, a plurality of strain sensors 9 may be mounted on one and the same surface of the drive compression member 7 so that the average of obtained values can be defined as the nozzle touch force, for example.

Figure 6:
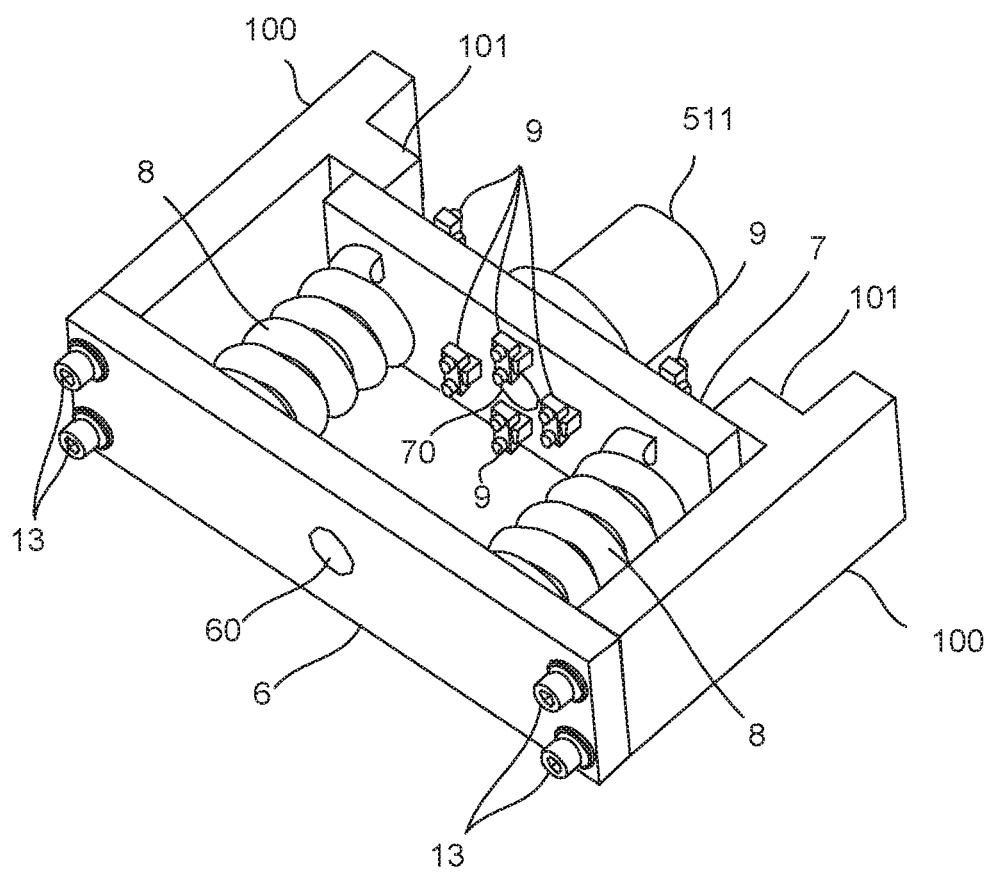
FIG. 6 is a view showing the resilient members and their surroundings (1) with a plurality of strain sensors mounted on the mounting surface of the drive compression member for the ball screw nut and the opposite surface.
Figure 7:
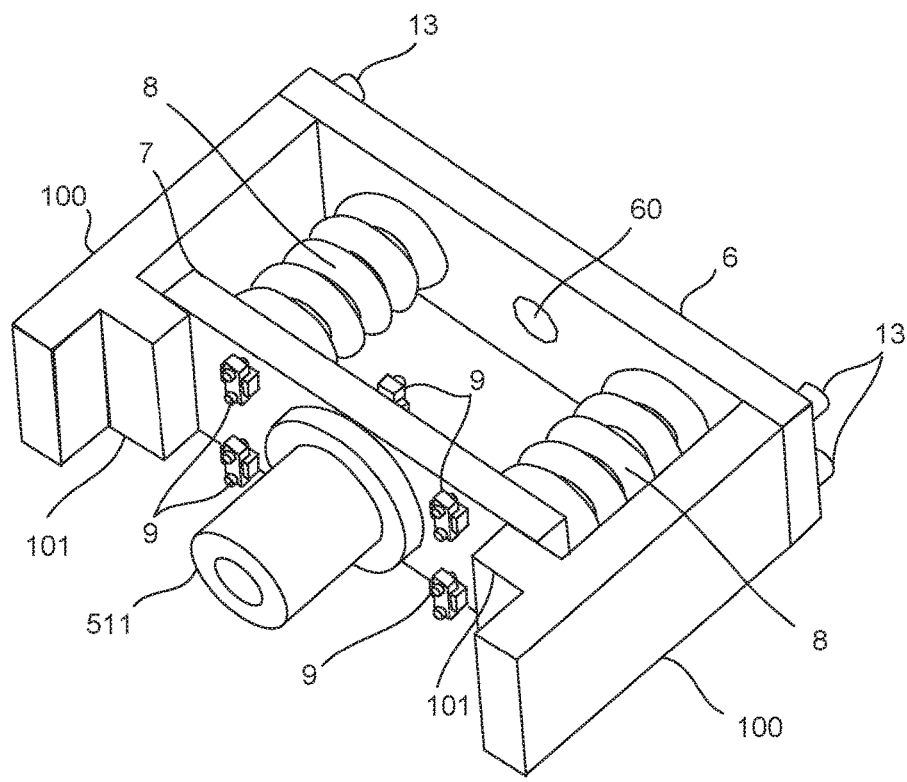
FIG. 7 is a view showing the resilient members and their surroundings (2) with the plurality of strain sensors mounted on the mounting surface of the drive compression member for the ball screw nut and the opposite surface.

FIGS. 6 and 7 are views showing the resilient members 8 and their surroundings with a plurality of strain sensors 9 mounted on the surface of the drive compression member 7 on which the ball screw nut 511 is mounted and the opposite surface of the drive compression member 7.

As shown in FIGS. 6 and 7, four strain sensors 9 are mounted on each of the opposite surfaces of the drive compression member 7 around the ball screw nut 511 mounting position thereof. By doing this, even if the amount of change of the strain relative to the change of the nozzle touch force in each position varies, the actually produced nozzle touch force can be reliably measured based on the average of strain values acquired from the strain sensors 9. If necessary, the nozzle touch force may be measured by using a maximum value, minimum value, median, or any of measured values itself, in place of the average.

Figure 8:
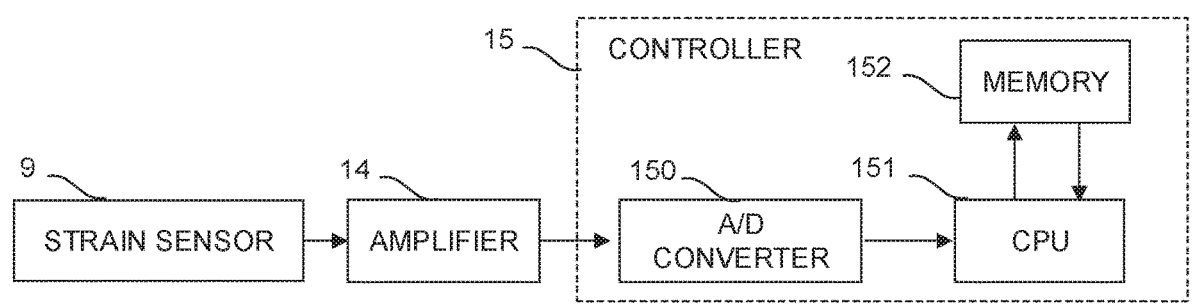
FIG. 8 is a block diagram showing a principal function of the injection molding machine according to the one embodiment of the present invention.

FIG. 8 shows a means for calculating the nozzle touch force based on an output value from the strain sensor 9.

The voltage output from the strain sensor 9 is amplified by an amplifier 14 and input to a controller 15. After the voltage output is digitized by an A/D converter 150 in the controller 15, the nozzle touch force is calculated based on it by a CPU 151. Calculation formulas, calculation results and the like are recorded in a memory 152. A formula for calculating a nozzle touch force F can be expressed by the following equation (1):

$$F = \varepsilon \times A = V \times B. \tag{1}$$

Here F is the nozzle touch force, $\varepsilon$ is a strain amount, V is a voltage output of the amplifier, and A and B are proportionality constants.

Although the unit of each value used in the above equation (1) may be freely changed according to the purpose, it should be done carefully because the values of the proportionality constants also change if the unit is changed. Since the strain amount $\varepsilon$ is proportional to the voltage output V of the amplifier, the nozzle touch force can be calculated from the amplifier voltage output if the proportionality constant B is fixed appropriately.

The proportionality constant B is a constant that is determined depending on the type of the injection molding machine 1. The proportionality constant B may be determined by a method in which the nozzle touch force is measured by a calibrated load cell interposed between the nozzle 12 and the mold 11 and a value obtained by dividing the nozzle touch force by the voltage output produced from the amplifier 14 at the same time may be determined to be the proportionality constant B. If a plurality of molded articles are to be manufactured by the same model, the proportionality constant B should only be measured and stored in advance in the memory 152. Moreover, the proportionality constant B may possibly vary depending on the finished dimensions of components of the injection molding machine 1 despite the use of the same model, so that the proportionality constant B may be measured and registered in the memory 152 for each machine. The calculated nozzle touch force may be used for the control of another mechanical unit or its value may be displayed on an operation screen.

In the present invention, the compression member for compressing a spring is fitted with the strain sensor for detecting the strain of the compression member so that the nozzle touch force can be estimated based on the strain amount detected by the mounted strain sensor, in consideration of the fact that the compression member is subjected to a sufficiently detectable strain even when the nozzle touch force is not larger than the preload of the spring after the mold is contacted by the nozzle. In this way, the nozzle touch force not larger than the spring preload, which cannot be detected by prior art techniques, is made detectable. Thus, even in the case where the nozzle touch force is produced by means of the resilient force of the spring with the preload, control can be performed so that a predetermined nozzle touch force is produced to prevent resin leakage during injection and the nozzle touch force is reduced to such a degree that the mold does not leave the nozzle during mold opening. Consequently, deformation of the mold by the nozzle touch force can be suppressed to improve the durability of the mold.

While an embodiment of the present invention has been described herein, the invention is not limited to the above-described embodiment and may be suitably modified and embodied in various forms.

The invention claimed is:

1. An injection molding machine, comprising:
   a nozzle;
   an injection device;
   a drive unit configured to move the injection device;
   a nozzle touch mechanism configured to press the nozzle attached to the injection device against a mold, the nozzle touch mechanism comprising:
      a drive compression member connected to the drive unit;
      an injection compression member connected to the injection device;
      at least one resilient member interposed between the drive compression member and the injection compression member;
      at least one strain sensor mounted on the drive compression member; and
   a processor configured to calculate a nozzle touch force based on an output value or output values output from the at least one strain sensor,
   wherein the at least one resilient member comprises a plurality of resilient members, and
   wherein the at least one strain sensor is mounted on the drive compression member between the plurality of resilient members.

2. The injection molding machine according to claim 1, wherein
   the at least one strain sensor comprises a plurality of strain sensors, and
   the plurality of strain sensors are attached to the drive compression member between the plurality of resilient members.

3. The injection molding machine according to claim 1, wherein the drive unit comprises a motor and a ball screw, and a ball screw nut in threaded engagement with a ball screw shaft of the ball screw is secured to the drive compression member.

4. The injection molding machine according to claim 3, wherein
the at least one strain sensor is mounted on the surface of the drive compression member on which the ball screw nut is mounted and/or an opposite surface of the drive compression member.

5. The injection molding machine according to claim 3, wherein
the at least one strain sensor comprises a plurality of strain sensors mounted on the drive compression member between the ball screw nut and the plurality of resilient members.

6. The injection molding machine according to claim 3, wherein
the at least one strain sensor comprises a plurality of strain sensors mounted on opposing surfaces of the drive compression member around the ball screw nut.

7. The injection molding machine according to claim 2, wherein
the processor is configured to calculate the nozzle touch force based on the output values acquired from the plurality of strain sensors attached to the drive compression member.

8. The injection molding machine according to claim 1, wherein the injection molding machine further comprises a pair of induction members configured to secure ends of the injection compression member by at least one securing mechanism.

\* \* \* \* \*